UNITED STATES PATENT OFFICE.

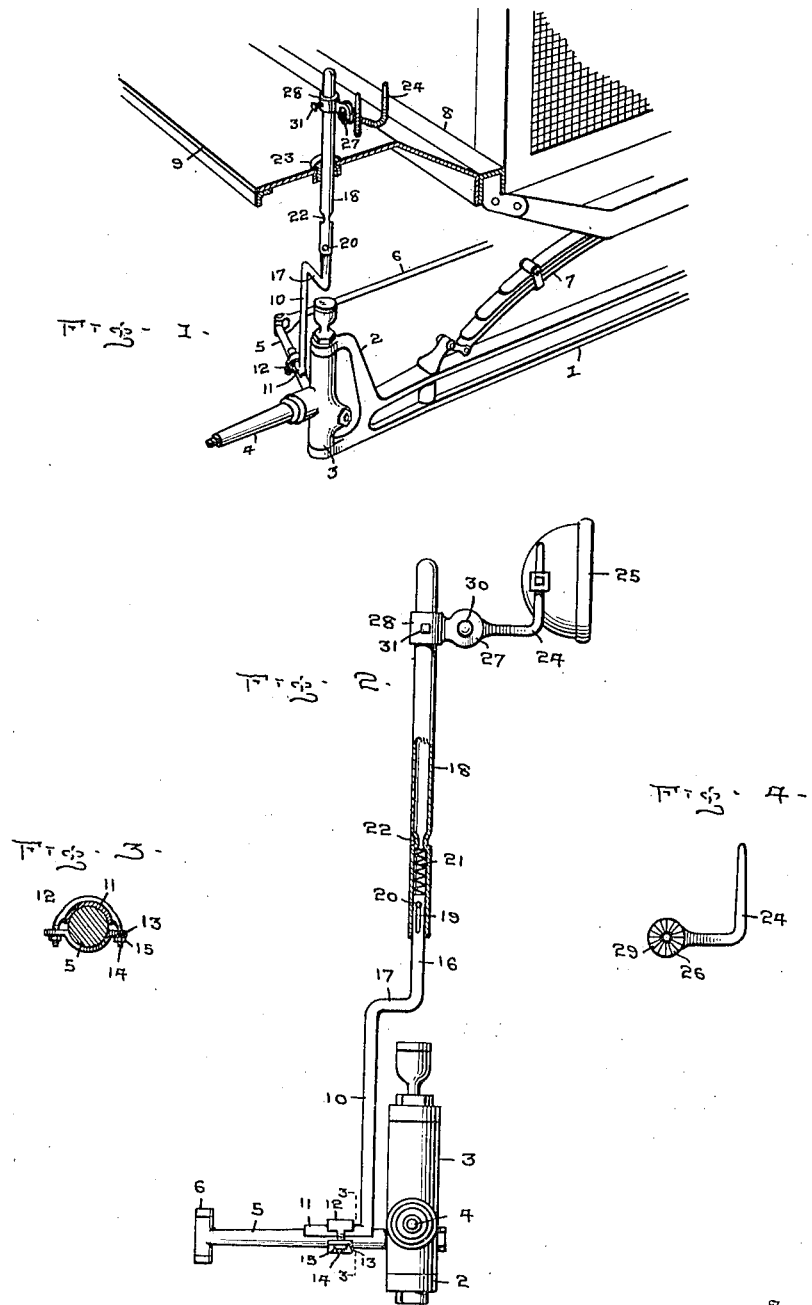

LEONARD E. WALTERS, OF JIM FALLS, WISCONSIN.

CONTROLLING MEANS FOR HEADLIGHTS.

1,261,659.　　　　　Specification of Letters Patent.　　Patented Apr. 2, 1918.

Application filed May 16, 1916, Serial No. 97,822. Renewed October 3, 1917. Serial No. 194,592.

*To all whom it may concern:*

Be it known that I, LEONARD E. WALTERS, a citizen of the United States, residing at Jim Falls, in the county of Chippewa and State of Wisconsin, have invented certain new and useful Improvements in Controlling Means for Headlights; and I do hereby declare the following to be a full, clear, and exact description of the invention, such as will enable others skilled in the art to which it appertains to make and use the same.

My invention relates to new and useful improvements in light controlling means for automobiles or similarly propelled vehicles and my object is to provide means for shifting the position of the head light of the vehicle to project the rays of light in the path of the travel or trend of the forward wheels of the vehicle.

A further object is to provide means for yieldingly mounting the lamps whereby the movement of the body of the car independently of the running gear of the vehicle will be compensated for.

And a further object is to provide means for attaching the lamp controlling parts to the steering mechanism of the vehicle.

Other objects and advantages will be hereinafter set forth and more particularly pointed out in the accompanying specification.

In the accompanying drawings which are made a part of this application,

Figure 1 is a detail perspective view of a portion of an automobile showing my improved light controlling means attached thereto.

Fig. 2 is an enlarged elevation of the lamp supporting mechanism partly in section showing the manner of attaching the same to the steering parts of the vehicle.

Fig. 3 is an enlarged detail sectional view as seen on line 3—3 of Fig. 2, and

Fig. 4 is a side elevation of the lamp supporting basket.

Referring to the drawings in which similar reference numerals designate corresponding parts throughout the several views, 1 indicates the forward axle of an automobile, or similarly propelled vehicle, 2 the usual form of yoke, 3 the knuckle employed for supporting the wheel carrying spindle, 4 and 5 indicates the steering arm attached to the knuckle 3 for guiding the front wheels of the vehicle, said arm being attached to the usual form of steering rod 6. Mounted upon the axle 1 is a spring 7 of the usual construction to which is attached the chassis 8 of the vehicle, said chassis having the usual or any preferred form of fender 9 attached thereto.

In order to mount the head lights of the automobile in such manner that they will be shifted so as to cast the rays of the light directly in the path of the travel of the forward portion of the machine, a shaft 10 is attached to the steering arm 5 by forming a foot 11 on the lower end of the shaft, said foot being semicircular in cross section so as to fit the contour of the steering arm and is clamped in position upon the steering arm by means of a two-part clip 12, one section of the clip having ears 13 with which engage bolts 14 carried by the other section of the clip, nuts 15 being employed for drawing the two parts of the clip together to clamp the foot in engagement with the arm.

In order to bring the upper end 16 of the shaft directly in line with the vertical axis of the knuckle 3, the shaft 10 is provided with an angular extension 17 so that although the lower end of the shaft swings in an arc of a circle when the knuckle is rotated to change the direction of travel of the wheel the axis of the end 16 will always remain concentric with the axis of the knuckle 3.

Coöperating with the upper end 16 of the shaft 10 is a hollow standard 18, the movement of the standard upon the end 16 being limited by providing an elongated slot 19 in the end 16 through which projects a pin 20 carried by the walls of the standard 18, and in order to compensate for the movement of the body of the vehicle independently of the axle of the vehicle and eliminate unnecessary jars from the shaft 10, a cushioning spring 21 is placed within the standard above the end portion 16, the walls of the standard having struck in portions 22 against which the upper end of the spring bears.

The standard 18 projects upwardly through the fender 9 and in order to prevent undue friction or wearing between the standard and fender, said standard is introduced through a bushing 23, which bushing extends through the opening in the fender provided for the passage of the standard. Adjustably attached to the upper end of the standard is a bracket 24 which carries the lamp or head light 25, said bracket terminating in a head 26 which coöperates with a similar head 27 attached to a collar 28, the meeting faces of the heads having serrations 29 which are adapted to interlock with each other to hold the bracket in adjusted position, a bolt 30 being extended through said heads to clamp the engaging faces thereof together.

By attaching the bracket in this manner, the same may be tilted to cause the rays of light to travel upwardly or downwardly, as occasion may require, and the bracket may be likewise raised or lowered upon the standard and held in its adjusted position by means of a set screw 31.

In operation, after the lamp has been properly positioned upon the bracket and the vehicle is traveling in a straight line forwardly the rays from the lamp will be accordingly reflected in a straight line forwardly of the machine, but as soon as the course of the front wheels are changed as when turning to the right or left, the swinging of the steering arm 5 to change the course of the wheels will cause the standard 18 to rotate coincident to the rotation of the knuckle 3, thereby causing the rays of light to be thrown directly forwardly of the line of travel of the wheels of the vehicle.

The advantages resulting from mounting the head lights in this manner will be readily apparent as the rays of light will be thrown directly upon any object or obstruction that may be in the path of the wheel during the turning action, which would not be possible were the head lights stationary upon the vehicle, and by forming the standard hollow, gas tubes or electric wires may be readily extended therethrough from a point below the fender so as to obscure such parts from view.

It will likewise be seen that this device can be very cheaply constructed and may be attached to any make of car having this form of steering gear and may be attached in position with a minimum amount of labor and time.

Having thus fully described my invention what I claim as new and desire to secure by Letters Patent of the United States, is:—

In a light controlling means, the combination with a lamp and steering rod of a shaft having an anchoring foot and a disalined section; a hollow standard having a constricted portion and adapted to receive at its lower end said disalined section; a coiled spring interposed between said constricted portion and the upper end of said disalined section, and means to attach the lamp to the upper end of said standard.

In testimony whereof I have signed my name to this specification in the presence of two subscribing witnesses.

LEONARD E. WALTERS.

Witnesses:
PERRY T. CHEEVER,
CHAS. DOUGLASS.

Copies of this patent may be obtained for five cents each, by addressing the "Commissioner of Patents, Washington, D. C."